(12) United States Patent
Witte et al.

(10) Patent No.: US 10,910,956 B2
(45) Date of Patent: Feb. 2, 2021

(54) METHOD FOR OPERATING A FREQUENCY CONVERTER AND FREQUENCY CONVERTER

(71) Applicant: Lenze Automation GmbH, Aerzen (DE)

(72) Inventors: Fritz Witte, Hameln (DE); Thomas Petersen, Braunschweig (DE); Dirk Duesterberg, Emmerthal (DE)

(73) Assignee: Lenze Automation GmbH, Aerzen (DE)

(*) Notice: Subject to any disclaimer, the term of this patent is extended or adjusted under 35 U.S.C. 154(b) by 0 days.

(21) Appl. No.: 15/746,738

(22) PCT Filed: Jul. 19, 2016

(86) PCT No.: PCT/EP2016/067182
§ 371 (c)(1),
(2) Date: Jan. 22, 2018

(87) PCT Pub. No.: WO2017/013117
PCT Pub. Date: Jan. 26, 2017

(65) Prior Publication Data
US 2018/0219493 A1 Aug. 2, 2018

(30) Foreign Application Priority Data

Jul. 20, 2015 (DE) .................. 10 2015 213 648

(51) Int. Cl.
*H02M 7/5387* (2007.01)
*H02P 27/14* (2006.01)
*H02P 27/08* (2006.01)

(52) U.S. Cl.
CPC ........ *H02M 7/53875* (2013.01); *H02P 27/08* (2013.01); *H02P 27/14* (2013.01); *H02M 2007/53876* (2013.01); *H02P 2209/13* (2013.01)

(58) Field of Classification Search
CPC ............. H02M 3/3376; H02M 7/5387; H02M 7/53871; H02M 7/53875;
(Continued)

(56) References Cited

U.S. PATENT DOCUMENTS 6,069,808 A * 5/2000 Panahi ............. H02M 7/53875
363/98
9,628,004 B2 * 4/2017 Sakai .................. H02M 7/5395
(Continued)

FOREIGN PATENT DOCUMENTS

CN 101860295 A 10/2010
DE 101 49 270 A1 4/2003
(Continued)

OTHER PUBLICATIONS

International Search Report (PCT/ISA/210) issued in PCT Application No. PCT/EP2016/067182 dated Dec. 8, 2016 with English translation (five pages).
(Continued)

*Primary Examiner* — Shawki S Ismail
*Assistant Examiner* — Monica Mata
(74) *Attorney, Agent, or Firm* — Crowell & Moring LLP

(57) ABSTRACT

A method is provided for operating a frequency converter, which is designed to drive a three-phase motor, wherein the frequency converter has three half-bridges each having at least two switches. The method includes the following steps: generating three phase voltages for the three-phase motor by a pulse width modulation, wherein, for the pulse width modulation, various switching patterns of the switches are
(Continued)

activated, wherein specific star point voltages ensue for various groups of switching patterns; and in at least one operating state of the frequency converter, within a respective period of the pulse width modulation, activating only those switching patterns in which an identical star point voltage ensues.

10 Claims, 2 Drawing Sheets

(58) Field of Classification Search
CPC ..... H02M 2007/53876; Y02B 70/1441; H02P 27/08; H02P 27/14; H02P 2209/13
USPC .......................................................... 363/98
See application file for complete search history.

(56) References Cited

U.S. PATENT DOCUMENTS

| | | |
|---|---|---|
| 2010/0244599 A1 | 9/2010 | Saban et al. |
| 2014/0112040 A1 | 4/2014 | White |
| 2014/0233262 A1 | 8/2014 | Zhao et al. |

FOREIGN PATENT DOCUMENTS

| | | | |
|---|---|---|---|
| EP | 2 722 978 A2 | 4/2014 | |
| JP | 2015061440 A * | 3/2015 | .......... H02M 7/5395 |

OTHER PUBLICATIONS

German-language Written Opinion (PCT/ISA/237) issued in PCT Application No. PCT/EP2016/067182 dated Dec. 8, 2016 with English translation (nine pages).
Gonzalez et al., "Improvement possibilities of PWM voltage inverter EMI effects using different modulation methods", EPE, 1999, pp. 1-10.
Cacciato et al., "Reduction of Common-Mode Currents in PWM Inverter Motor Drives", IEEE Transactions of Industry Applications, Mar./Apr. 1999, pp. 469-476, vol. 35, No. 2.
Muetze et al., "On Radio-Frequency Based Detection of High-Frequency Circulating Bearing Current Flow", IEEE, 2013, pp. 1289-1294.
Cacciato et al., "Reduction of Common Mode Currents in PWM Inverter Motor Drives," Industry Applications Conference, 1997, Thirty-Second IAS Annual Meeting, IAS '97, Conference Record of the 1997 IEEE, Oct. 5, 1997, pp. 707-714, vol. 1 (eight (8) pages).
German-language European Office Action issued in counterpart European Application No. 16751189.8 dated May 15, 2019 (seven (7) pages).
German-language Chinese Office Action issued in Chinese Application No. 201680042856.2 dated Dec. 5, 2019 with partial English translation (nine (9) pages).
German-language Office Action issued in European Application No. 16751189.8 dated Oct. 21, 2020 (eight (8) pages).
Busse et al., "Bearing Currents and Their Relationship to PWM Drives," IEEE Transactions on Power Electronics, Mar. 1997, pp. 243-252, vol. 12, No. 2, XP011043032 (10 pages).
Skibinski et al., "Installation Considerations for IGBT AC Drives," IEEE Annual Textile, Fiber and Film Industry Technical Conference, May 6-8, 1997, pp. 1-12, XP000848905 (12 pages).
Muetze et al., On Radio-Frequency-Based Detection of High-Frequency Circulating Bearing Current Flow, IEEE Transactions on Industry Applications, Jul./Aug. 2014, pp. 2592-2601, vol. 50, No. 4, XP011553366 (10 pages).
Guzinski et al., "Variable Speed AC Drives with Inverter Output Filters," Nov. 23, 2015,pp. 45-104, XP055739722 (60 pages).

* cited by examiner

| G  | B1 | B2 | B3 | US     |
|----|----|----|----|--------|
| G1 | 1  | 1  | 1  | UZK/2  |
| G2 | 0  | 1  | 1  | UZK/6  |
| G2 | 1  | 0  | 1  | UZK/6  |
| G2 | 1  | 1  | 0  | UZK/6  |
| G3 | 1  | 0  | 0  | -UZK/6 |
| G3 | 0  | 1  | 0  | -UZK/6 |
| G3 | 0  | 0  | 1  | -UZK/6 |
| G4 | 0  | 0  | 0  | -UZK/2 |

METHOD FOR OPERATING A FREQUENCY CONVERTER AND FREQUENCY CONVERTER

BACKGROUND AND SUMMARY OF THE INVENTION

The invention relates to a method for operating a frequency converter, which is designed to drive a three-phase motor, and to a frequency converter.

DE 101 49 270 A1 discloses a space-vector-based switching pattern for minimizing the star point voltage fluctuations in a three-phase machine operated at a DC link converter.

The invention is based on the object of providing a method for operating a frequency converter and a frequency converter that reduce fluctuations in the star point voltage even further compared to DE 101 49 270 A1.

The invention achieves this object by a method for operating a frequency converter, which is configured to drive a three-phase motor, wherein the frequency converter has three half-bridges each having at least two switching devices, wherein the method comprises the following steps: generating three phase voltages for the three-phase motor by a pulse width modulation, wherein, for the pulse width modulation, various switching patterns of the switching devices are activated, wherein various groups of switching patterns induce specific star point voltages; and in at least one operating state of the frequency converter, within a respective period of the pulse width modulation, only those switching patterns that induce an identical star point voltage are activated. The invention further achieves this object by a frequency converter which is configured to drive a three-phase motor, having: three half-bridges each having at least two switching devices; and a control unit, which is configured to drive the switching devices in such a way that the method is executed.

The method serves to operate a frequency converter, for example in the form of a DC link converter. The frequency converter is designed to drive a three-phase motor or a three-phase machine. The frequency converter conventionally has three half-bridges. Each of the three half-bridges conventionally has at least two switching devices.

Three phase voltages for the three-phase motor are generated by means of the frequency converter by means of a pulse width modulation, wherein, for the pulse width modulation, various switching patterns of the switching devices are activated, wherein group-specific star point voltages ensue for various groups of switching patterns or various groups of switching patterns induce group-specific star point voltages. In this respect, reference is also made to the relevant technical literature and to DE 101 49 270 A1.

In accordance with the invention, during at least one operating state of the frequency converter, within a respective (basic) switching period of the pulse width modulation, only those switching patterns that belong to one of the groups of switching patterns, that is to say in which an identical, group-specific star point voltage ensues, are activated. In this way, a change in star point voltage on account of a switching pattern change can be prevented.

A star point voltage within the meaning of the present invention is typically understood to mean a voltage whose change over time leads to undesired currents, in particular to leakage currents over mechanical bearings of the electric motor. This may be, for example, a voltage that acts between stator and rotor. In the case of star connection, the star point voltage may be the actual star point voltage. For other interconnections, the star point voltage may be, for example, a virtual or imaginary star point voltage, which can be calculated, for example, by delta-star transformation in the case of delta connection. The star point voltage can also alternatively be referred to as the common-mode voltage.

The half-bridges can each have a first state during which an output of the respective half-bridge is connected to a positive DC link potential. The first state of a respective half-bridge is denoted by "1". The half-bridges can each have a second state during which an output of the respective half-bridge is connected to a negative DC link potential. The second state of a respective half-bridge is denoted by "0". During the at least one operating state, within a respective period of the pulse width modulation, only the following switching patterns are activated: either (100, 010, 001) or (011, 101, 110). The switching patterns 100, 010, 001 belong to a first group of switching patterns and the switching patterns 011, 101, 110 belong to a second group of switching patterns, wherein the switching patterns within a group can be activated in any order. For the switching patterns 100, 010, 001, within a respective period of the pulse width modulation, only precisely one of the half-bridges is always connected at one time to the positive DC link potential. For the switching patterns 011, 101, 110, within a respective period of the pulse width modulation, only precisely one of the half-bridges is always connected at one time to the negative DC link potential. In this way, fluctuations in the star point voltage are prevented. However, the maximum deliverable motor voltage is reduced in comparison with conventional drive methods.

A change in group between successive periods of the pulse width modulation is typically avoided.

The at least one operating state of the frequency converter can be set below a threshold rotational speed of the electric motor. Above the threshold rotational speed of the electric motor, within a respective period of the pulse width modulation, switching patterns of arbitrary groups can be activated. Below the threshold rotational speed, a protective oil film is generally not formed in bearings of the electric motor, over which bearings currents flow on account of fluctuations in the star point voltage. In this rotational speed range, fluctuations in the star point voltage are therefore reduced or substantially completely prevented in accordance with the invention, wherein, in said rotational speed range, the reduced voltage delivery range can be accepted. Above the threshold rotational speed, the protective oil film has generally been formed in such a way that fluctuations in the star point voltage are more tolerable. It goes without saying that switchover can be effected depending on the threshold rotational speed taking suitable hysteresis into account. The threshold rotational speed can be selected depending on the rotational speed from which an oil film typically forms in bearings of the electric motor. The threshold rotational speed can be determined, for example, by way of trials on various motor types/bearing types. The threshold rotational speed can be selected depending on the motor type or independently of the motor type. As an order of magnitude, the threshold rotational value can be, for example, in a range between 100 revolutions/minute to 1000 revolutions/minute.

The frequency converter according to the invention is designed to drive a three-phase motor and has three half-bridges each having at least two switching devices. The frequency converter further has a control unit, for example in the form of a microcontroller. The control unit is designed to drive the switching devices in such a way that a method as described above is executed.

BRIEF DESCRIPTION OF THE DRAWINGS

The invention is described in detail below with reference to the drawings.

DETAILED DESCRIPTION OF THE DRAWINGS

Figure 1:
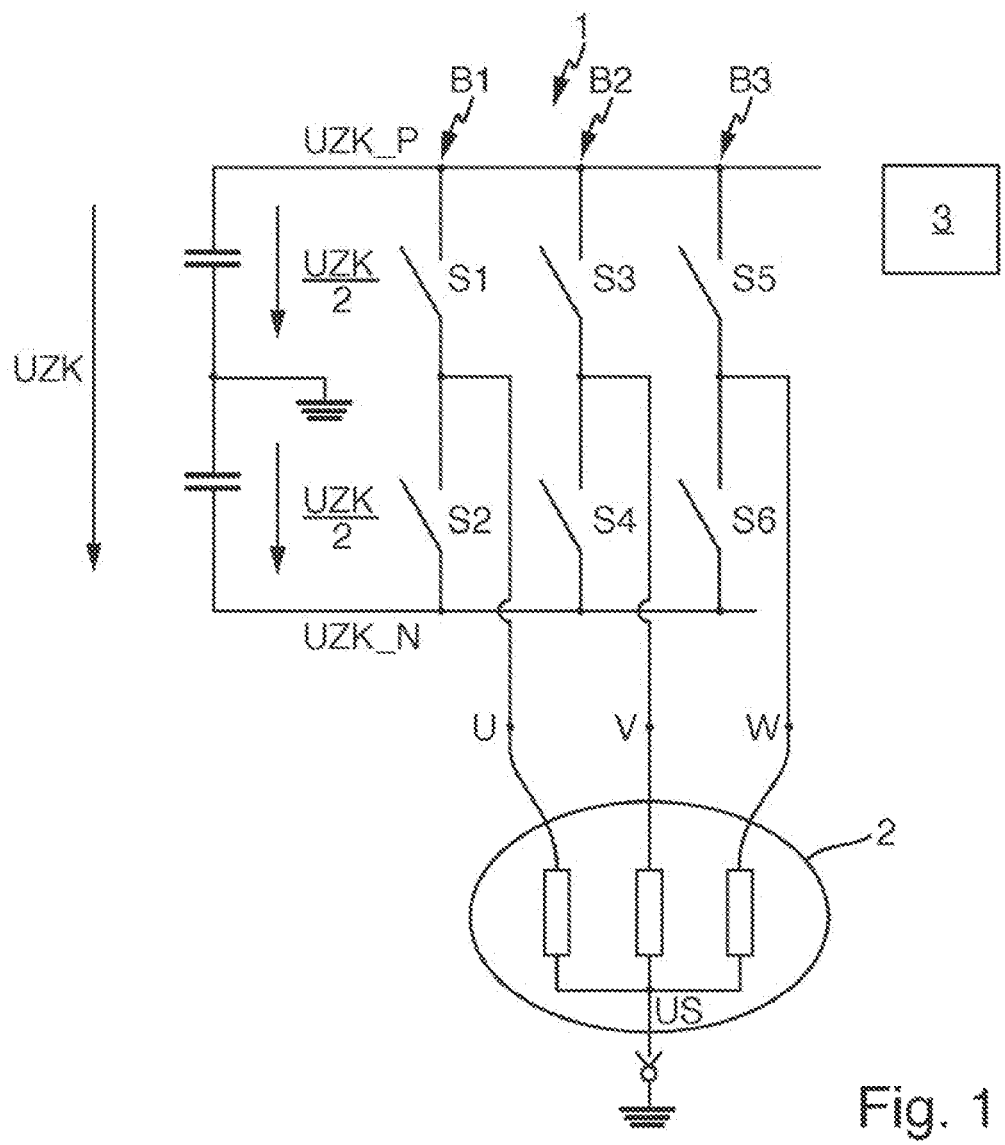
FIG. 1 shows a frequency converter, which is designed to drive a three-phase motor, wherein the frequency converter has three half-bridges each having two switching devices.

FIG. 1 shows a frequency converter 1, which is designed to drive a three-phase motor 2. The frequency converter 1 conventionally has three half-bridges B1, B2, B3. The half-bridge B1 has two switching devices S1, S2. The half-bridge B2 has two switching devices S3, S4. The half-bridge B3 has two switching devices S5, S6. The half-bridges are looped in between a positive DC link potential UZK_P and a negative DC link potential UZK_N, wherein a connection node of the switching device of a respective bridge (output of the bridge) is electrically connected to a phase connection U, V or W of the three-phase motor 2. In this respect, reference is also made to the relevant technical literature.

The half-bridges B1, B2, B3 each have a first state during which an output of the respective half-bridge B1, B2, B3 is connected to the positive DC link potential UZK_P, wherein the respective state of the half-bridge B1, B2, B3 is denoted by 1. The half-bridges B1, B2, B3 each have a second state during which an output of the respective half-bridge B1, B2, B3 is connected to the negative DC link potential UZK_N, wherein the respective state of the half-bridges B1, B2, B3 is denoted by 0.

Figures 2, 3:
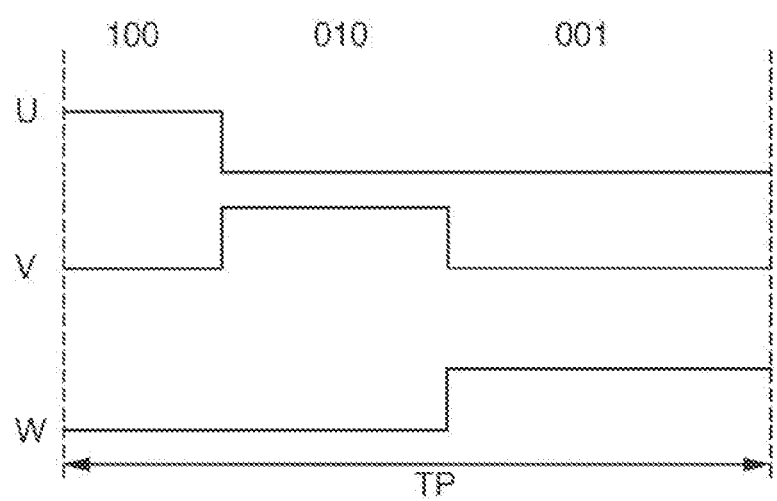
FIG. 2 shows various groups of switching patterns of the switching device and associated star point voltages.
FIG. 3 shows a period of a pulse width modulation having a sequence of switching patterns of a group having an identical star point voltage.

FIG. 2 shows various groups G1 to G4 of switching patterns of the switching devices S1, S2; S3, S4; S5, S6 and associated values of star point voltages US.

In the group G1, all the bridges B1, B2, B3 have the state 1, that is to say the switching devices S1, S3, S5 are closed and the switching devices S2, S4, S6 are open. A star point voltage US of UZK/2 results.

In the group G2, two of the bridges B1, B2 and B3 have the state 1 and one of the bridges B1, B2 and B3 has the state 0. A star point voltage US of UZK/6 results.

In the group G3, two of the bridges B1, B2 and B3 have the state 0 and one of the bridges B1, B2 and B3 has the state 1. A star point voltage US of –UZK/6 consequently results.

In the group G4, all the bridges B1, B2, B3 have the state 0, that is to say the switching devices S1, S3, S5 are open and the switching devices S2, S4 and S6 are closed. A star point voltage US of –UZK/2 results.

Below a threshold rotational speed of the electric motor 2, within a respective period of a pulse width modulation (see also FIG. 3), only switching patterns either from group G2 or from group G3 are set in accordance with the invention. The threshold rotational speed can be selected depending on the rotational speed from which an oil film is typically formed in bearings of the electric motor 2.

The fluctuations in star point voltage, that is to say the voltage between stator and rotor as well, can have a destructive effect when said voltage across the mechanical bearings is shorted, wherein high current densities may ensue in the tribological contact faces of the bearings, said high current densities being able to temporarily fuse the contact faces of the bearing. Said instances of fusing are torn in the case of further rotation and lead to the destruction of the surface of the mechanical bearing. This relates especially to standstill and operation at slow rotation frequencies, since a closed, insulating lubricating film still cannot form here and, in this operating range, it can therefore result in conductive metallic contact.

In the lower rotational speed range, for example up to approximately 50% of the rated rotational speed of the motor, only switching patterns of one of the groups are therefore used, with the result that no bearing currents arise. In the case of a three-phase system, switching patterns of groups 2 or 3 are expediently used. A combined use of the switching patterns of groups 2 or 3 in successive or different periods is typically not provided in said rotational speed range.

In the upper rotational speed range, for example from approximately 50% of the rated rotational speed of the motor, within a respective period and/or in different (successive) periods, for example, only two groups immediately adjacent to their star point voltage are used, for example groups 2 and 3, with the result that only 33% to 50% of the fluctuation in the star point voltage occurs compared to conventional operation.

It goes without saying that the switching patterns can also be limited to those from groups G2 and G3 depending on other operating states or permanently.

FIG. 3 shows, by way of example, a PWM period TP of the pulse width modulation having a sequence of switching patterns 100, 010, 001 of group G2 having an identical star point voltage –UZK/6. It goes without saying that the switching patterns can also be generated in a different order, for example 001, 010, 100, etc. The sequence of switching patterns shown fully prevents fluctuations in the star point voltage.

In accordance with the invention, bearing currents on account of fluctuations in the star point voltage can consequently be prevented to a large extent. This further reduces the interference emission and residual currents significantly. However, the delivery range of the output voltage is reduced.

On account of the lower residual currents, which prevent triggering of a residual current circuit breaker, the use of the invention is possible, for example, in office applications (photocopiers, etc.) and in medical technology (drive of a hospital bed, etc.).

The current ripple in the motor phases that is present at low output voltages can be used, for example, for identifying wire breakages in a motor phase and for evaluation in the context of applications without sensors.

What is claimed is:

1. A method for operating a frequency converter, which is configured to drive a three-phase motor, wherein the frequency converter has three half-bridges each having at least two switching devices, wherein the method comprises the steps of:
generating three phase voltages for the three-phase motor by a pulse width modulation, wherein, for the pulse width modulation, switching patterns of the switching devices are activated, wherein various groups of switching patterns induce a plurality of group-specific star point voltages at an output of the three-phase motor; and
in at least one operating state of the frequency converter, within a respective period of the pulse width modulation, activating only groups of switching patterns, from among the various groups of switching patterns, that include a plurality of different switching patterns within an individual group that induce an identical star point voltage from among the plurality of group-specific star point voltages.

2. The method as claimed in claim 1, wherein
the three half-bridges each have a first state during which an output of the respective half-bridge is connected to a positive DC link potential, said state being denoted by 1, and each have a second state during which an output of the respective half-bridge is connected to a negative DC link potential, said state being denoted by 0, wherein,
in the at least one operating state, within a respective period of the pulse width modulation, only the following switching patterns are activated: either (100, 010, 001) or (011, 101, 110).

3. The method as claimed in claim 2, wherein
the at least one operating state of the frequency converter is set below a threshold rotational speed of the electric motor.

4. The method as claimed in claim 1, wherein
the at least one operating state of the frequency converter is set below a threshold rotational speed of the electric motor.

5. The method as claimed in claim 3, wherein
above the threshold rotational speed of the electric motor, within a respective period of the pulse width modulation, switching patterns of arbitrary groups are activated.

6. The method as claimed in claim 4, wherein
above the threshold rotational speed of the electric motor, within a respective period of the pulse width modulation, switching patterns of arbitrary groups are activated.

7. A frequency converter for driving a three-phase motor, comprising:
three half-bridges, each having at least two switching devices; and
a control unit operatively configured to drive the switching devices, the control unit executing processing to:
generate three phase voltages for the three-phase motor by a pulse width modulation, wherein, for the pulse width modulation, switching patterns of the switching devices are activated, wherein various groups of switching patterns induce a plurality of group-specific star point voltages at an output of the three-phase motor; and
in at least one operating state of the frequency converter, within a respective period of the pulse width modulation, activating only groups of switching patterns, from among the various groups of switching patterns, that include a plurality of different switching patterns within an individual group that induce an identical star point voltage from among the plurality of group-specific star point voltages.

8. The frequency converter as claimed in claim 7, wherein
the three half-bridges each have a first state during which an output of the respective half-bridge is connected to a positive DC link potential, said state being denoted by 1, and each have a second state during which an output of the respective half-bridge is connected to a negative DC link potential, said state being denoted by 0, wherein, in the at least one operating state, within a respective period of the pulse width modulation, only the following switching patterns are activated: either (100, 010, 001) or (011, 101, 110).

9. The frequency converter as claimed in claim 8, wherein
the at least one operating state of the frequency converter is set below a threshold rotational speed of the electric motor.

10. The frequency converter as claimed in claim 9, wherein above the threshold rotational speed of the electric motor, within a respective period of the pulse width modulation, switching patterns of arbitrary groups are activated.

* * * * *